United States Patent
Ensle

(10) Patent No.: US 9,712,031 B2
(45) Date of Patent: Jul. 18, 2017

(54) ELECTROMAGNETIC PROPULSION SYSTEM

(71) Applicant: Harold Ellis Ensle, Arvada, CO (US)

(72) Inventor: Harold Ellis Ensle, Arvada, CO (US)

( * ) Notice: Subject to any disclaimer, the term of this patent is extended or adjusted under 35 U.S.C. 154(b) by 126 days.

(21) Appl. No.: 13/944,336

(22) Filed: Jul. 17, 2013

(65) Prior Publication Data
US 2015/0022031 A1    Jan. 22, 2015

(51) Int. Cl.
| H02K 41/025 | (2006.01) |
| F03H 99/00  | (2009.01) |
| H02J 7/02   | (2016.01) |
| B64G 1/40   | (2006.01) |

(52) U.S. Cl.
CPC ........... H02K 41/025 (2013.01); F03H 99/00 (2013.01); B60L 2200/26 (2013.01); B64G 1/409 (2013.01); H02J 7/025 (2013.01); Y02T 10/7005 (2013.01)

(58) Field of Classification Search
CPC ...... F03H 99/00; B60L 2200/26; H02J 7/025; H02K 41/025
USPC ...... 310/300, 308–309, 202–203, 208, 12.21
See application file for complete search history.

(56) References Cited

U.S. PATENT DOCUMENTS

| 5,142,861 | A  | * | 9/1992  | Schlicher et al. | ........... | 60/203.1 |
| 5,197,279 | A  | * | 3/1993  | Taylor           | ........... | 60/203.1 |
| 6,492,784 | B1 | * | 12/2002 | Serrano          | ........... | F03H 99/00 315/111.61 |
| 7,115,881 | B2 | * | 10/2006 | Rabinowitz et al. | ..... | 250/423 R |
| 7,736,771 | B2 | * | 6/2010  | Sullivan         | ........... | C02F 1/48 361/522 |
| 7,864,013 | B2 | * | 1/2011  | Muelleman        | ........... | 336/178 |
| 8,459,002 | B2 | * | 6/2013  | McLean et al.    | ........... | 60/202 |
| 2004/0089763 | A1 | * | 5/2004 | Redmond         | ........... | B64C 39/00 244/10 |
| 2005/0109879 | A1 | * | 5/2005 | Patterson       | ........... | 244/172 |

(Continued)

OTHER PUBLICATIONS

John R Warfield, Electromagnetic Propulsion of Matter in Violation of Newton's 3rd Law, 2010, Proceedings of the NPA.*

(Continued)

*Primary Examiner* — Michael Zarroli

(57) ABSTRACT

A system for propelling craft which is applicable in any environment. It employs an alternating magnetic field supplied by a coil. A parallel plate capacitor is situated so that the flux of the magnetic field flows between the plates of the capacitor. The capacitor is charged and discharged in synchronization with the alternating magnetic field. The changing magnetic field creates an electric field that applies a force to the charge in the plates which is then transferred to the body of the device. Any induced reactive electric force on the coil affects equally the protons and electrons in the wires of the coil creating the magnetic field, thus the force is non-reactive. At the same time, the changing electric field in the capacitor creates a magnetic field. The current in the coils and/or the surface current in the ferromagnetic material (if present) experiences a force from the magnetic field. The magnetic field created by these currents, however, has no free charge between the plates of the capacitor with which to react, thus this force is also non-reactive. The two forces are in opposite directions, but are not the same magnitude, thus the device is propelled in a single direction.

7 Claims, 1 Drawing Sheet

(56) References Cited

U.S. PATENT DOCUMENTS

Figure 1:
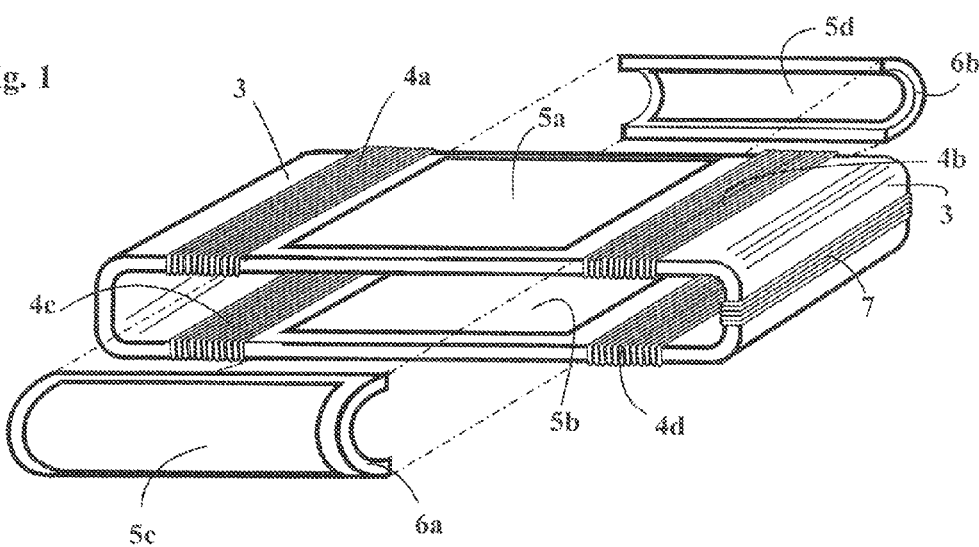

| | | | | |
|---|---|---|---|---|
| 2006/0065789 | A1* | 3/2006 | Woodward et al. | 244/171.5 |
| 2008/0061191 | A1* | 3/2008 | Gochnour | 244/171.5 |
| 2010/0251691 | A1* | 10/2010 | Mills | F03H 99/00 60/202 |
| 2012/0092107 | A1* | 4/2012 | Baptista De Alves Martins | 335/306 |
| 2013/0342033 | A1* | 12/2013 | Essex | 310/20 |
| 2014/0021907 | A1* | 1/2014 | Yu et al. | 320/108 |
| 2014/0084697 | A1* | 3/2014 | Yasuda et al. | 307/104 |
| 2014/0111054 | A1* | 4/2014 | Heins | H02K 3/00 310/195 |
| 2015/0001347 | A1* | 1/2015 | Bultel | 244/171.1 |

OTHER PUBLICATIONS

G. M. Graham & D. G. Lahoz, Observation of Static Electromagnetic Angular Momentum in vacuo, May 15, 1980, Nature, vol. 285, pp. 154-155.*

Ben Yu-Kuang Hu, Introducing electromagnetic field momentum, May 4, 2012, IOP Publishing, European Journal of Physics, 33 (2012) 873-881.*

Sample Format for Revised Amendment Practice, Jun. 2003, USPTO.*

Authorization for Electronic Communication, USPTO.*

Authorization for Electronic Communication;.*

* cited by examiner

ELECTROMAGNETIC PROPULSION SYSTEM

BACKGROUND

Currently the primary propulsion of craft that is generally applicable to all environments such as in air or space is rocket propulsion. While used with moderate success, this method has been commonly known to have serious limitations. The need to eject mass at high velocities requires enormous energy and the mass needs to be supplied by the craft, particularly if no substance is available from the environment (for example, in the vacuum of space). As distance and velocity requirements increase, the percentage of the weight of the craft that must be allocated to fuel storage becomes unacceptably large. Even when the craft is not accelerating, for example, if hovering at some constant distance from the ground, a large amount of energy still has to be expended to maintain position.

SUMMARY

The invention of the present application is a system for propelling craft which is applicable in any environment. This has advantage over typical propulsion methods as no mass needs to be ejected. The system employs an alternating magnetic field supplied by a coil with or without a ferromagnetic core. A parallel plate capacitor is situated so that the flux of the magnetic field flows between the plates of the capacitor. The ferromagnetic material can itself be placed between the plates of the capacitor with or without being isolated from the plates with additional dielectric material depending on the conductivity of the ferromagnetic material. The capacitor is charged and discharged in synchronization with the alternating magnetic field. The changing magnetic field creates an electric field that applies a force to the charge in the plates which is then transferred to the body of the device. Any induced reactive electric force on the coil affects equally the protons and electrons in the wires of the coil creating the magnetic field. At the same time, the changing electric field in the capacitor creates a magnetic field. The current in the coils and/or the surface current in the ferromagnetic material experiences a force from the magnetic field. The magnetic field created by these currents, however, has no free charge between the plates of the capacitor with which to react, thus a force is not applied. The two forces are in opposite directions, but are not the same magnitude, thus the device is propelled in a single direction. This is provided that the alternating current and charging of the capacitor are properly synchronized.

DRAWINGS

FIG. 1 is the illustrative embodiment of a complimentary pair of electromagnetic propulsion systems where one system is comprised of the coils 4a. 4b and the capacitor 5a. The other system is comprised of coils 4c, 4d and the capacitor 5b. The ferromagnetic materials 3 are connected together into a single piece.

Figure 2:
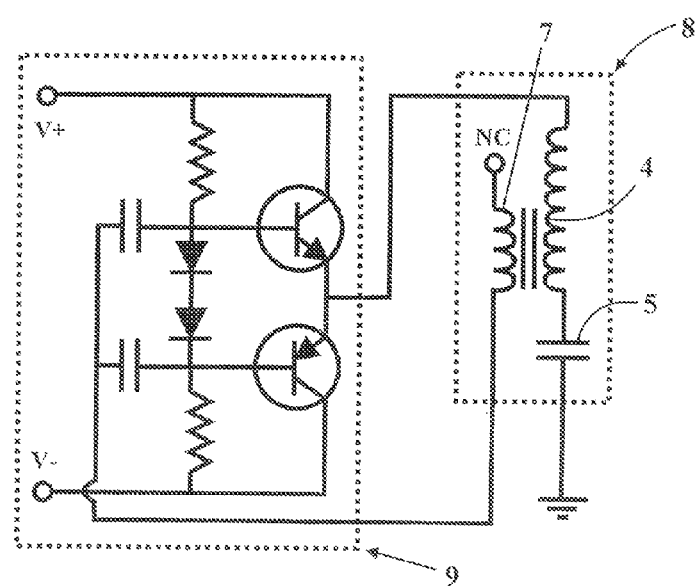

FIG. 2 is the diagram of a possible circuit that could be used to power the electromagnetic propulsion systems.

DESCRIPTION OF THE ILLUSTRATIVE EMBODIMENT

This embodiment (FIG. 1) is composed of one or more capacitors 5 and one or more coils 4, which would typically be wrapped around a ferromagnetic material 3 which should have low conductivity. While a single parallel plate capacitor with the flux from a single coil would be adequate to create the force, the illustrated embodiment described here uses multiple capacitors and coils in a particular arrangement which make the operation more efficient.

In FIG. 1 there are two parallel plate capacitors 5a and 5b where the upper plate of capacitor 5a is separated by the non-conductive ferromagnetic material from the lower plate. The upper plate of capacitor 5b is separated by the non-conductive ferromagnetic material from the lower plate. The capacitors can be connected in parallel or series depending on various optimizing parameters, but the electric field generated between the plates of the lower capacitor 5b should always be in the opposite direction of the electric field generated in the upper capacitor 5a. These plates would normally be made of copper, but any good conductor would suffice. The two parallel plate capacitors 5a and 5b each represent a dipole where, when being charged and discharged, they generate electric dipole radiation. Because of the very high voltage and frequency involved, this dipole radiation would represent a significant power loss. However, since the two parallel plate capacitors are charged symmetrically with their poles in opposite directions, the non-aligned dipole radiation is canceled by destructive interference, thus the highest order radiation is the quadrupole radiation which is much less than the dipole radiation and this greatly reduces the power loss. While the ferromagnetic material is non-conductive, additional layers of insulation can be added between the plates of the capacitors 5a and 5b if need be.

The non-conductive ferromagnetic material 3 is shaped into a flat elongated toroid. This channels the flux generated by the coils 4a, 4b, 4c, and 4d between the plates of the capacitors 5a and 5b. The coils can be connected in parallel or series depending on various optimizing parameters, but the direction of the current in each coil must be the same so that they support the same direction of flux around the toroid. An alternating current flows through these coils to produce an alternating magnetic field along the entire length of the ferromagnetic material. This toroidal shape, besides directing the flux also substantially eliminates the non-aligned magnetic dipole radiation by destructive interference which would be present due to the high currents and frequency generated in the device. This then avoids another source of power loss.

Optionally two additional curved plate capacitors 5c and 5d can be attached to each side of the ferromagnetic toroid. The plates of these capacitors are separated by a dielectric that is not ferromagnetic and has substantially the same dielectric constant as the ferromagnetic material. The charging of he capacitors 5c and 5b are synchronized so that the electric field generated is in the same direction as the other capacitors 5a and 5b at the edge where they are attached. If capacitors 5c and 5d are attached, the force caused by the magnetic field from the changing electric field of the capacitors 5 is canceled out.

FIG. 2 represents a possible driving circuit for the electromagnetic propulsion system. The dotted square 8 encloses the electrical schematic of the components contained in the inductive propulsion system as illustrated in FIG. 1. The primary coils 4 which can be connected in series or in parallel (displayed as the inductor 4 in FIG. 2) are connected in series to the capacitor 5 which represents the capacitance of all capacitors 5a, 5b, 5c and 5d of FIG. 1 which are connected in parallel or series. This is accomplished by attaching the leads from the coils to the appropriate conductive surface on the plates (these connections not illustrated in FIG. 1). The feed-back coil 7 represents the secondary coil 7 of FIG. 1. The dotted square 9 encloses an AB class amplifier which would typically be made of discrete components as special transistors are needed that function at high voltage, high frequency, and high current. These can also be replaced by vacuum tubes depending on the overall power requirements.

The inductor and capacitor arrangement in the electromagnetic propulsion system creates an LC or tank circuit. This, in conjunction with the amplifier and the feed-back coil, constitutes an oscillator which creates an alternating current at the resonance frequency of the LC circuit. Therefore the charge in the capacitor and the current through the inductor are alternating in a synchronized fashion. Any wave shape of alternating current would suffice for the propulsion system to succeed. However, this particular driving circuit produces a sinusoidal varying current. This is substantially the simplest circuit that provides the means for synchronizing the alternating current and driving it at resonance. This is used as illustration and there is a wide variety of possible circuits that could be designed to drive the propulsion system.

The entire device of FIG. 1 is typically placed in a sealed container (not illustrated) of mineral oil or other electrically insulating non-polar liquid to suppress electrical arcing and corona discharge.

Looking at FIG. 1, the changing magnetic field around the ferromagnetic material 3 creates an electric field that applies a force to the charge in the conductive plates of the capacitors 5a and 5b, which is then transferred to the body of the device. When the charge on the plates reverses, the change in the current reverses at the same time, thus the net force is always in the same direction. Any induced reactive electric force on the coils 4 and the surface current in the ferromagnetic material 3 affects equally the protons and electrons in the wires of the coil and the ferromagnetic material creating the magnetic field. At the same time, the changing electric field in the capacitors 5a and 5b creates a magnetic field whose direction is parallel to the toroid 3 on the front and back edges. The magnetic field on the back edge is opposite to the magnetic field on the front edge, thus the surface current in the ferromagnetic material is flowing through the magnetic field such that it experiences a force which is in the same direction for all the components. There is no free charge between the plates of the capacitors 5a and 5b for the magnetic field created by the surface current to apply a force to, therefore another force is generated. This force is in the opposite direction of the force caused by the changing magnetic field in the toroid 3. However, these forces are not equal, so the device is propelled in a single direction. If capacitors 5c and 5d are included, there is substantially no net force generated by the changing electric field in the capacitors 5a and 5b.

While an illustrative embodiment has been displayed and described, various modifications and substitutions may be made thereto without departing from the spirit and scope of the present invention. Accordingly, it is to be understood that the present invention has been described by way of illustration and not limitation.

What is claimed as new is:

1. A propulsion system comprising:
   a. a parallel plate capacitor with the conductive plates separated by a vacuum or by a material with a low dielectric constant,
   b. a means to charge and discharge said capacitor,
   c. an electrical coil placed such that the magnetic flux that would be produced by said coil flows between the plates of said capacitor substantially in a uniform direction and parallel to said plates of said capacitor,
   d. a means to drive an alternating current through said coil, and
   e. a means to synchronize the charging of said capacitor with the alternating current in said coil so that the said charging and said alternating current are at the same frequency and that, when said capacitor is fully charged the current through said coil is substantially zero, whereby the force on the plates of said capacitor generated by the electric field arising from the change in the magnetic field of said coil and the force on said coil generated by the magnetic field from the change in the electric field of said capacitor results in a net force which is always in the same direction and said system is propelled in said direction.

2. The propulsion system of claim 1 wherein said capacitor and said coil are electrically connected in series to provide the means to synchronize the variation of charge in said capacitor and alternating current of said coil.

3. The propulsion system of claim 1 wherein means are provided to drive said alternating current at resonance.

4. The propulsion system of claim 1 wherein the magnetic flux of said varying magnetic field is channeled between the plates of said capacitor by means of a ferromagnetic material which can then be magnetized by said coil.

5. The propulsion system of claim 1 wherein a copy of said propulsion system where the electric field of said capacitor is always in the opposite direction of the capacitor of said copy is placed sufficiently near the said propulsion system as to significantly reduce energy loss due to radiation wherein said capacitors are electrically connected either in series or in parallel.

6. The propulsion system of claim 5 wherein a ferromagnetic material is placed between the capacitor plates of each propulsion system and the ends of each ferromagnetic material are connected to create a toroidal shape which acts as a magnetic circuit which travels through each capacitor and through each coil.

7. The propulsion system of claim 5 wherein two parallel plate capacitors are attached to both sides of said two capacitors electrically connected in series or parallel and means is provided to synchronize their charging and discharging so that the magnetic field created at the location of attachment by the changing electric fields of said capacitors is substantially reduced to zero.

* * * * *